US012112676B2

(12) United States Patent
Liu et al.

(10) Patent No.: US 12,112,676 B2
(45) Date of Patent: Oct. 8, 2024

(54) DEMURA METHOD FOR DISPLAY PANEL

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventors: Jinfeng Liu, Guangdong (CN); Yue Fan, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/618,406

(22) PCT Filed: Nov. 3, 2021

(86) PCT No.: PCT/CN2021/128286

§ 371 (c)(1),
(2) Date: Dec. 10, 2021

(87) PCT Pub. No.: WO2023/029199

PCT Pub. Date: Mar. 9, 2023

(65) Prior Publication Data

US 2024/0062696 A1 Feb. 22, 2024

(30) Foreign Application Priority Data

Sep. 6, 2021 (CN) ........................ 202111037139.X

(51) Int. Cl.
*G09G 3/20* (2006.01)
*G09G 3/3208* (2016.01)
*G09G 3/36* (2006.01)

(52) U.S. Cl.
CPC ......... *G09G 3/2007* (2013.01); *G09G 3/3208* (2013.01); *G09G 3/36* (2013.01); *G09G 2320/0233* (2013.01)

(58) Field of Classification Search
CPC .................................................... G09G 3/2007
See application file for complete search history.

(56) References Cited

U.S. PATENT DOCUMENTS

2003/0184508 A1 10/2003 Lee
2008/0001869 A1 1/2008 Chung
(Continued)

FOREIGN PATENT DOCUMENTS

CN 1956031 A 5/2007
CN 101248478 A 8/2008
(Continued)

OTHER PUBLICATIONS

International Search Report in International application No. PCT/CN2021/128286,mailed on May 20, 2022.
(Continued)

*Primary Examiner* — William Boddie
*Assistant Examiner* — Andrew B Schnirel
(74) *Attorney, Agent, or Firm* — PV IP PC; Wei Te Chung

(57) ABSTRACT

A demura method for a display panel includes the steps: obtaining brightness data of a display image at a gray scale value; calculating the brightness data of the display image to obtain demura data of the pixel; dividing bits of the demura data of the pixel into first bits and second bits according to a bit length of the pixel, setting an integer gray scale value
(Continued)

200 of the pixel according to the first bits, and setting a mixed gray scale value of the pixel according to the second bits.

17 Claims, 3 Drawing Sheets

(56) References Cited

U.S. PATENT DOCUMENTS

| | | | | |
|---|---|---|---|---|
| 2008/0136846 | A1* | 6/2008 | Abe | G09G 3/3685 345/690 |
| 2013/0307869 | A1* | 11/2013 | Baumgart | G09G 5/02 345/600 |
| 2018/0053456 | A1* | 2/2018 | Selan | G09G 3/2003 |
| 2018/0191371 | A1* | 7/2018 | Tao | H03M 7/30 |
| 2018/0218693 | A1* | 8/2018 | Zhang | G09G 3/3607 |
| 2019/0371219 | A1* | 12/2019 | Lin | G09G 3/03 |
| 2020/0098303 | A1* | 3/2020 | Kim | G09G 3/3614 |
| 2022/0180788 | A1* | 6/2022 | Kim | G09G 3/20 |

FOREIGN PATENT DOCUMENTS

| | | | |
|---|---|---|---|
| CN | 106328083 | A | 1/2017 |
| CN | 107564461 | A | 1/2018 |
| CN | 107644410 | A | 1/2018 |
| CN | 110648627 | A | 1/2020 |
| JP | 2013073172 | A | 4/2013 |
| JP | 2013222048 | A | 10/2013 |

OTHER PUBLICATIONS

Written Opinion of the International Search Authority in International application No. PCT/CN2021/128286,mailed on May 20, 2022.

Chinese Office Action issued in corresponding Chinese Patent Application No. 202111037139.X dated Nov. 29, 2022, pp. 1-7.

* cited by examiner

| | | | | | |
|---|---|---|---|---|---|
| 4.9375 | 5.1250 | 6.1250 | 6.5000 | 7.0000 | 7.3750 |
| 4.7500 | 5.2500 | 5.7500 | 6.0000 | 6.4375 | 6.8750 |
| 4.6250 | 5.0625 | 5.3750 | 5.6875 | 6.0625 | 6.5000 |
| 4.4375 | 4.7500 | 5.0625 | 5.5625 | 5.8125 | 6.1875 |
| 4.1875 | 4.3750 | 4.6250 | 5.1875 | 5.5625 | 6.0000 |

FIG. 1A (Prior Art)

| | | | | | |
|---|---|---|---|---|---|
| 5 | 5 | 6 | 7 | 7 | 7 |
| 5 | 5 | 6 | 6 | 6 | 7 |
| 5 | 5 | 5 | 6 | 6 | 7 |
| 4 | 5 | 5 | 6 | 6 | 6 |
| 4 | 4 | 5 | 5 | 6 | 6 |

FIG. 1B (Prior Art)

| | | | | | |
|---|---|---|---|---|---|
| 5 | 5 | 6 | 7 | 7 | 7 |
| 5 | 5 | 6 | 6 | 6 | 7 |
| 5 | 5 | 5 | 6 | 6 | 7 |
| 4 | 5 | 5 | 6 | 6 | 6 |
| 4 | 4 | 5 | 5 | 6 | 6 |

FIG. 1C (Prior Art)

310

| | | | | | |
|---|---|---|---|---|---|
| 4 | 5 | 6 | 6 | 7 | 7 |
| 4 | 5 | 5 | 6 | 6 | 6 |
| 4 | 5 | 5 | 5 | 6 | 6 |
| 4 | 4 | 5 | 5 | 5 | 6 |
| 4 | 4 | 4 | 5 | 5 | 6 |

320

| | | | | | |
|---|---|---|---|---|---|
| 15/16 | 2/16 | 2/16 | 8/16 | 0 | 6/16 |
| 12/16 | 4/16 | 12/16 | 0 | 7/16 | 14/16 |
| 10/16 | 1/16 | 6/16 | 11/16 | 1/16 | 8/16 |
| 7/16 | 12/16 | 1/16 | 9/16 | 13/16 | 3/16 |
| 3/16 | 6/16 | 10/16 | 3/16 | 9/16 | 0 |

FIG. 3A

| | | | | | |
|---|---|---|---|---|---|
| 4 15/16 | 5 2/16 | 6 2/16 | 6 8/16 | 7 | 7 6/16 |
| 4 12/16 | 5 4/16 | 5 12/16 | 6 | 6 7/16 | 6 14/16 |
| 4 10/16 | 5 1/16 | 5 6/16 | 5 11/16 | 6 1/16 | 6 8/16 |
| 4 7/16 | 4 12/16 | 5 1/16 | 5 9/16 | 5 13/16 | 6 3/16 |
| 4 3/16 | 4 6/16 | 4 10/16 | 5 3/16 | 5 9/16 | 6 |

FIG. 3B

DEMURA METHOD FOR DISPLAY PANEL

FIELD OF INVENTION

The present disclosure relates to the field of display technology, and more particularly, to a demura method for a display panel.

BACKGROUND OF INVENTION

Mura refers to the phenomenon of various traces caused by the non-uniform brightness in the display. At present, this problem is generally solved by improving manufacturing processes. However, some mura cannot be improved through the manufacturing processes, but must be solved through external compensation technology, which is usually known as demura.

For a final display panel product, the physical characteristics thereof have been finalized. In order to compensate for the mura phenomenon caused by defects in the process, the brightness of pixels can be corrected by gray-scale compensation, so as to improve the mura phenomenon. Gray scale compensation is to improve the brightness uniformity by changing the gray scales of pixels. Generally, the process of demura is to photograph a mura condition of a gray-scale picture by a camera. When the input image is a single gray-scale picture (theoretically, the brightnesses shown by all pixels are the same), mura is extracted and corrected through some algorithms according to the brightness of the central area of the panel, so as to increase a certain gray-scale compensation value for the pixels in the dark area (enhancing the brightness), and to decrease a certain gray scale compensation value for the pixels in the bright area (reducing the brightness). In other words, for pixels with high display brightness, the original gray scales thereof are reduced by a certain compensation value; for pixels with low display brightness, the original gray scales thereof are increased by a certain compensation value. Therefore, the brightness of each pixel tends to be the same after gray scale compensation, so as to improve the mura phenomenon. The compensation values (or known as demura data) of all pixels can be made into a demura table for processing by hardware (e.g., processor).

References are made to FIG. 1A to FIG. 10. FIG. 1A shows a schematic diagram of demura data in the prior art. FIG. 1B shows a schematic diagram of a demora table based on FIG. 1A. FIG. 10 shows a schematic diagram of image gray scales according to the demura table in FIG. 1B. As shown in FIG. 1A, when performing demura, since the bit length of the pixel of the gray-scale image captured by the camera is greater than the bit length of the pixel of the display panel, the demura data obtained by each pixel in the conversion process includes a remainder. On the condition that the display panel displays low gray scales, the remainder of the demura data is rounded, thereby resulting in a great number of large-area pixel groups having the same gray scale values (as shown in FIG. 1B), and thus the brightness differences between the large-area pixel groups with low gray scales (as shown in FIG. 10) tend to be perceived by the human eye.

SUMMARY OF INVENTION

Technical Problem

A demura method for a display panel is disclosed to solve the technical problem that the brightness difference occurs in the existing display panel.

Technical Solutions

In order to solve the aforementioned problem, the technical solutions are provided in the present disclosure as below.

A demura method for a display panel is disclosed, which includes: obtaining brightness data of a display image displayed by a display panel at a given gray scale value; calculating the brightness data of the display image to obtain demura data of each pixel of the display panel; and dividing bits of the demura data of each pixel into first bits and second bits according to a bit length of the pixel of the display panel, setting an integer gray scale value of each pixel according to the first bits, and setting a mixed gray scale value of each pixel according to the second bits.

In some embodiments, the first bits are high order bits of the demura data corresponding to the bit length of the pixel of the display panel, and the second bits are low order bits of the demura data except the first bits.

In some embodiments, the mixed gray scale value is a ratio of the number of the frames displaying the value of the integer gray scale value plus one to the total frame number.

In some embodiments, the bit length of the demura data is greater than the bit length of the pixel of the display panel.

In some embodiments, the bit length of the demura data is 12 bits, and the bit length of the pixel of the display panel is 8 bits.

In some embodiments, the demura method for the display panel further includes: generating a demura table and a mixed table according to the integer gray scale value and the mixed gray scale value of the demura data of each pixel, respectively.

In some embodiments, the step of obtaining the brightness data of the display image in the display panel at the given gray scale value includes: performing flat-field correction, black level correction, and linearity correction on an imaging device; and obtaining the brightness data of the display image in the display panel at the given gray scale value through the imaging device.

In some embodiments, before the step of calculating the brightness data of the display image to obtain the demura data of each pixel of the display panel, the demura method further includes: performing Moire elimination and distortion correction on the display image.

In some embodiments, the display panel is a liquid crystal display panel or an organic light-emitting diode display panel.

Beneficial Effect

A demura method for a display panel is disclosed in the present disclosure. By dividing the demura data of each pixel into an integer gray scale value and a mixed gray scale value, and displaying the number of the frames displaying a value of the integer gray scale value plus one and the number of the frames displaying the integer gray scale value according to the mixed gray scale value, the gray scale compensation value of the demura data of the pixel can be presented equivalently and completely. As a result, the edge of mura tends to be smooth without obvious boundary, so as to improve the non-uniform brightness of the display panel and improve the display quality of the image.

DESCRIPTION OF DRAWINGS

The technical solutions and other beneficial effects of the present disclosure are obvious by describing the specific embodiments of the present disclosure in combination with the accompanying drawings in detail.

FIG. 1A shows a schematic diagram of demura data in the prior art.

FIG. 1B shows a schematic diagram of a demora table based on FIG. 1A.

FIG. 1C shows a schematic diagram of image gray scales according to the demura table in FIG. 1B.

FIG. 3A shows a demura table and a mixed table generated according to the demura data in FIG. 1A.

FIG. 3B shows a schematic diagram of image gray scales according to the demura table and the mixed table in FIG. 3A.

DETAILED DESCRIPTION OF PREFERRED EMBODIMENTS

Figure 2:
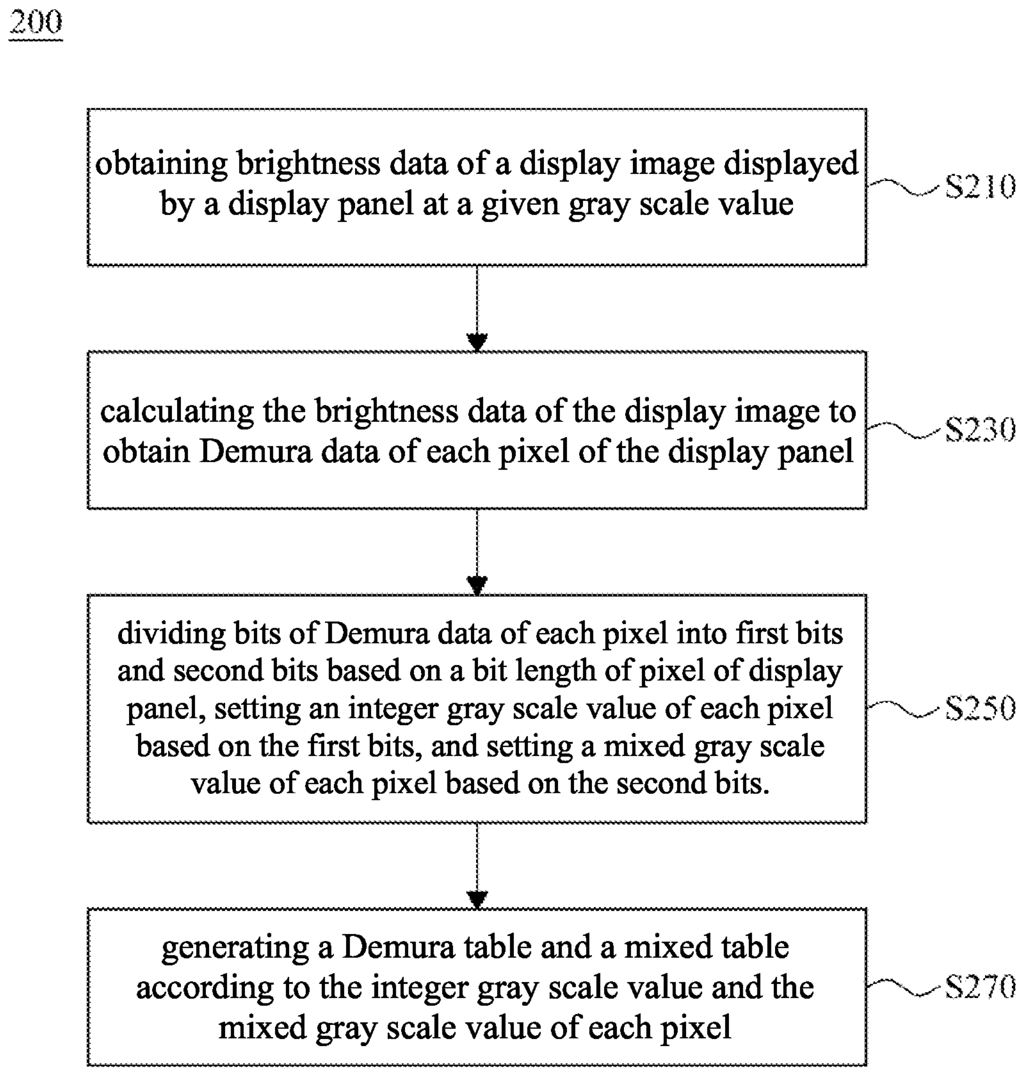
FIG. 2 is a flowchart of a demura method according to the present disclosure.

The technical solutions in the embodiments of the present disclosure are clearly and completely described below in combination with the accompanying drawings in the embodiments of the present disclosure. Obviously, the described embodiments are only a part of the embodiments of the present disclosure rather than all of the embodiments. Based on the embodiments in the present disclosure, all other embodiments obtained by a person of ordinary skill in the art without creative efforts fall within the claim scope of the present disclosure.

Reference is made to FIG. 2. FIG. 2 is a flowchart of a demura method 200 for a display panel according to the present disclosure. The demura method can be applied to the display panel to improve the mura condition of the display panel. The display panel may be, for example, a liquid crystal display panel or an organic light-emitting diode (OLED) display panel. First, in step S210, brightness data of a display image displayed by a display panel at a given gray scale value are obtained. Specifically, on the condition that all pixels of the display panel are provided with signals corresponding to the same gray scale value through, for example, a driving chip, the display image is photographed by an imaging device to obtain the brightness value presented by all pixels at the same gray scale value (i.e., the brightness data of each pixel). The imaging device may be, for example, a charge-coupled device (CCD) with high precision and high resolution or a photosensitive device such as a brightness meter.

Since the mura presented by the display panel may be different at different gray scales, the mura of the display screen at high, medium and low gray scales are detected in general. For example, the signals of 32, 64, 96, 160, 192, and 224 gray scales are provided for photographing by the imaging device.

In some embodiments, before the brightness data are obtained, the process, such as flat-field correction (FFC), black level correction, and linearity correction, may be performed on the imaging device to eliminate the factors of non-uniform brightness caused by the imaging device itself.

In the present embodiment, the bit length of the brightness data of each pixel obtained by the imaging device is greater than the bit length of the pixel of the display panel, so that the compensation effect of the demura method can be improved. In some embodiments, for each pixel, the bit length of the brightness data obtained by the imaging device is 12 bits and the bit length of the display panel is 8 bits, but they can be adjusted according to the actual panel design.

Next, in step S230, the brightness data of the display image is calculated to obtain demura data for each pixel. Specifically, a gamma index value of each pixel is calculated first, and then the area and data of mura are identified according to the index. For example, Fourier transform may be used to detect and identify the edge of mura. Alternatively, the brightness difference between each pixel and its surrounding pixels is compared, and mura is identified by calculating brightness gradient or chromatic aberration. Next, the demura data is generated by corresponding demura compensation algorithm according to the mura data. There are many kinds of demura compensation algorithms, but the basic principle is to increase a certain gray-scale compensation value for the pixels in the dark area (enhancing the brightness) and decrease a certain gray-scale compensation value for the pixels in the bright area (reducing the brightness). Generally, a smoothing algorithm is further required to eliminate mura edges. It should be noted that the approach of obtaining the demura data is not limited in the present disclosure. The present disclosure is to perform corresponding adjustments on the obtained demura data to smooth the mura edges, so as to improve the display effect of the image.

In the present embodiment, the bit length of the demura data of each pixel is the same as the bit length of the brightness data, for example, 12 bits.

In some embodiments, before the brightness data of the display image are calculated, the process, such as moire elimination and distortion correction, may be perfomed on the original display imagen, such as Moire elimination, distortion correction, etc., to further eliminate the brightness error caused by the imaging device.

Next, in step S250, the bits of the demura data of each pixel are divided into the first bits and the second bits according to the bit length of the pixel of the display panel, wherein an integer gray scale value of each pixel is set according to the first bits, and a mixed gray scale value of each pixel is set according to the second bits. In some embodiments, the first bits are high order bits of the demura data corresponding to the bit length of the pixel of the display panel, and the second bits are low order bits of the demura data except the first bits.

For example, it is supposed that the bit length of demura data is 12 bits and the bit length of the pixel of the display panel is 8 bits. On the condition that the demura data of one pixel is 79 gray scale, the high 8-bit (i.e., $(0000\ 0100)_2$) corresponding to the bit length (i.e., 8-bit) of the pixel of the display panel of the demura data (i.e., $79=(0000\ 0100\ 1111)_2$) is set as the first bits, and the integer gray scale value of the pixel is set as 4 according to the first bits $(0000\ 0100)_2$. Moreover, the low order bits (i.e., $(1111)_2$) of the demura data except the first bits are set as the second bits, and the mixed gray scale value is set as 15/16 according to the second bits.

In some embodiments, the bit length of the second bits is a total frame number of the number of frames displaying the value of the integer gray scale value plus one and the number of frames displaying the integer gray scale value for each pixel, wherein the mixed gray scale value is the ratio of the number of the frames displaying the value of the integer gray scale value plus one to the total frame number for each pixel.

In the above example, the length of the second bits is 4 bits, to which the corresponding total frame number is $2^4=16$ frames, and thus the mixed gray scale value of said pixel is 15/16, which represents that in 16 consecutive displayed frames, there are 15 frames to display the gray scale value of the integer gray scale value plus one (i.e., 5) and there is 1 frame to display the gray scale value of the integer gray scale value (i.e., 4) for said pixel. By setting the mixed gray-scale value, 4.9375 of 8 bits (the demura data 79 (12 bits), which is desired to be converted into 8 bits, is required to be divided by 16($2^4$), i.e., 79/16=4.9375) can be realized equivalently due to the cumulative effect of human vision. In this way, the brightness difference of the transition of the gray scale edge is reduced, and the phenomenon of non-uniform transition is improved.

Next, in step S270, a demura table and a mixed table are generated according to the integer gray scale value and the mixed gray scale value of the demura data of each pixel (as shown in FIG. 3A). In some embodiments, both the demura table and the mixed table are burned in a storage device such as a flash memory. When the demura function is activated, the data of the demura table and the mixed table are accessed from the flash memory to the static random access memory in the driver chip of the display panel so that the whole compensation data are obtained, and the compensated display data are generated according to the compensation data and the original data transmitted from the application terminal to realize the demura compensation effect.

References are both made to FIG. 3A and FIG. 3B. FIG. 3A shows a demura table 310 and a mixed table 320 generated according to the demura data in FIG. 1A, and FIG. 3B shows a schematic diagram of image gray scales according to the demura table 310 and the mixed table 320 in FIG. 3A. Since the gray scale compensation value of the demura data of each pixel is equivalently and completely presented by combining the demura table 310 with the mixed table 320 in FIG. 3A, there is no obvious difference in the image gray scales presented in FIG. 3B compared with FIG. 10. In other words, the edge of mura tends to be smooth without obvious boundary, so as to improve the display effect of the image.

To sum up, by dividing the demura data of each pixel into an integer gray scale value and a mixed gray scale value and displaying the number of the frames displaying a value of the integer gray scale value plus one and the number of the frames displaying the integer gray scale value according to the mixed gray scale value, the gray scale compensation value of the demura data of the pixel can be presented equivalently and completely. As a result, the edge of mura tends to be smooth without obvious boundary, so as to improve the non-uniform brightness of the display panel and improve the display quality of the image.

The technical features in the aforementioned embodiments may be randomly combined. For concise description, not all possible combinations of the technical features in the embodiment are described. However, the combinations of the technical features should all be considered as falling within the scope described in this specification provided that they do not conflict with each other.

The aforementioned embodiments only show several implementations of this application and are described in detail, but they should not be construed as a limit to the patent scope of this application. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A demura method for a display panel, comprising:

obtaining brightness data of a display image displayed by the display panel at a given gray scale value;

calculating the brightness data of the display image to obtain demura data of each pixel of the display panel; and dividing bits of the demura data of each pixel into first bits and second bits according to a bit length of the pixel of the display panel, setting an integer gray scale value of each pixel according to the first bits, and setting a mixed gray scale value of each pixel according to the second bits, wherein a bit length of the second bits is corresponding to a total frame number, wherein the total frame number is a sum of a number of frames displaying a value of the integer gray scale value plus one and a number of frames displaying the integer gray scale value for each pixel.

2. The demura method for the display panel according to claim 1, wherein the first bits are high order bits of the demura data corresponding to the bit length of the pixel of the display panel, and the second bits are low order bits of the demura data except the first bits.

3. The demura method for the display panel according to claim 1, wherein the mixed gray scale value is a ratio of the number of the frames displaying the value of the integer gray scale value plus one to the total frame number.

4. The demura method for the display panel according to claim 1, wherein a bit length of the demura data is greater than the bit length of the pixel of the display panel.

5. The demura method for the display panel according to claim 1, wherein a bit length of the demura data is 12 bits, and the bit length of the pixel of the display panel is 8 bits.

6. The demura method for the display panel according to claim 1, further comprising:

generating a demura table and a mixed table according to the integer gray scale value and the mixed gray scale value of the demura data of each pixel, respectively.

7. The demura method for the display panel according to claim 1, wherein the step of obtaining the brightness data of the display image in the display panel at the given gray scale value comprises:

performing flat-field correction, black level correction, and linearity correction on an imaging device; and obtaining the brightness data of the display image in the display panel at the given gray scale value through the imaging device.

8. The demura method for the display panel according to claim 1, wherein before the step of calculating the brightness data of the display image to obtain the demura data of each pixel of the display panel, the demura method further comprises:

performing Moire elimination and distortion correction on the display image.

9. The demura method for the display panel according to claim 1, wherein the display panel is a liquid crystal display panel or an organic light-emitting diode display panel.

10. A demura method for a display panel, comprising:

obtaining brightness data of a display image displayed by the display panel at a given gray scale value;

calculating the brightness data of the display image to obtain demura data of each pixel of the display panel; and dividing bits of the demura data of each pixel into first bits and second bits according to a bit length of the pixel of the display panel, setting an integer gray scale value of each pixel according to the first bits, and setting a mixed gray scale value of each pixel according to the second bits;

wherein the first bits are high order bits of the demura data corresponding to the bit length of the pixel of the display panel, and the second bits are low order bits of the demura data except the first bits;

wherein a bit length of the demura data is greater than the bit length of the pixel of the display panel, and wherein a bit length of the second bits is corresponding to a total frame number, wherein the total frame number is a sum of a number of frames displaying a value of the integer gray scale value plus one and a number of frames displaying the integer gray scale value for each pixel.

11. The demura method for the display panel according to claim 10, wherein the mixed gray scale value is a ratio of the number of the frames displaying the value of the integer gray scale value plus one to the total frame number.

12. The demura method for the display panel according to claim 10, further comprising:

generating a demura table and a mixed table according to the integer gray scale value and the mixed gray scale value of the demura data of each pixel, respectively.

13. The demura method for the display panel according to claim 10, wherein the step of obtaining the brightness data of the display image in the display panel at the given gray scale value comprises:

performing flat-field correction, black level correction, and linearity correction on an imaging device; and obtaining the brightness data of the display image in the display panel at the given gray scale value through the imaging device.

14. A demura method for a display panel, comprising:

obtaining brightness data of a display image displayed by the display panel at a given gray scale value;

performing Moire elimination and distortion correction on the display image;

calculating the brightness data of the display image to obtain demura data of each pixel of the display panel;

dividing bits of the demura data of each pixel into first bits and second bits according to a bit length of the pixel of the display panel, setting an integer gray scale value of each pixel according to the first bits, and setting a mixed gray scale value of each pixel according to the second bits; and generating a demura table and a mixed table according to the integer gray scale value and the mixed gray scale value of the demura data of each pixel, respectively, wherein a bit length of the second bits is corresponding to a total frame number, wherein the total frame number is a sum of a number of frames displaying a value of the integer gray scale value plus one and a number of frames displaying the integer gray scale value for each pixel.

15. The demura method of the display panel according to claim 14, wherein the first bits are high order bits of the demura data corresponding to the bit length of the pixel of the display panel, and the second bits are low order bits of the demura data except the first bits.

16. The demura method of the display panel according to claim 14, wherein the mixed gray scale value is a ratio of the number of the frames displaying the value of the integer gray scale value plus one to the total frame number.

17. The demura method of the display panel according to claim 14, wherein a bit length of the demura data is greater than the bit length of the pixel of the display panel.

* * * * *